March 20, 1962 — D. O. MILLER — 3,025,796

GEAR PUMP

Filed Oct. 3, 1955 — 2 Sheets-Sheet 1

INVENTOR.
Dale O. Miller
BY
Attorney

March 20, 1962  D. O. MILLER  3,025,796
GEAR PUMP

Filed Oct. 3, 1955  2 Sheets-Sheet 2

INVENTOR.
Dale O. Miller
BY
Attorney

United States Patent Office 3,025,796
Patented Mar. 20, 1962

3,025,796
GEAR PUMP
Dale O. Miller, 444 Waddington Ave., Birmingham, Mich.
Filed Oct. 3, 1955, Ser. No. 537,917
3 Claims. (Cl. 103—4)

This invention relates to gear pumps and particularly pertains to a new, novel and inventive gear pump having self-adjustable hydraulically actuated gear and wear plate erosion compensating means.

Gear pumps have been employed heretofore to deliver fluids under pressure and against back pressure for various purposes, however, the several devices of the prior art have not proven entirely satisfactory inasmuch as they are complicated in design and construction, expensive and intricate to manufacture, and difficult to keep in non-leaking condition due to the gears wearing against the wear plates causing leakage.

With the foregoing in view, the primary object of the invention is to provide a gear pump which is simple in design and construction, inexpensive and easy to manufacture, and which substantially eliminates the necessity of repair due to wear plate leakage in that the device includes self-compensating wear plates which are automatically advanced as wear progresses.

An object of the invention is to provide a gear pump which can be manufactured less expensively than present gear pumps as the component parts are easily made and machined and the assembly of parts readily accomplished and which employs duplicate parts to reduce individual part manufacture and service part supply.

An object of the invention is to provide a gear pump which is so integrated that it can be easily machined by an ordinary workman without intricate expensive highly skilled work being involved.

An object of the invention is to provide a gear pump which can be made in various sizes and dimensions for desired capacities without changes in the assembly or arrangement of parts.

An object of the invention is to provide floating wear plates in a gear pump which utilizes the delivery or pressure side of the pump to provide fluid pressure between the floating wear plates to urge them into sealing relationship with the gears to provide self-compensating adjustment for wear.

An object of the invention is to provide an interconnected channel between the shafts and bearings to facilitate draining off fluid which has leaked past the bearings and wear plate seals and an additional channel for delivering same to the delivery side of the pump thereby reintroducing the fluid into the system.

An object of the invention is to provide a pressure relief poppet valve channeled between the intake and outlet sides of the pump for recirculating excess delivery of fluid and for back pressuring the seals and bearings of the pump.

These and other objects of the invention will become apparent by reference to the following description of a gear pump embodying the invention taken in connection with the accompanying drawings in which.

Figure 1:
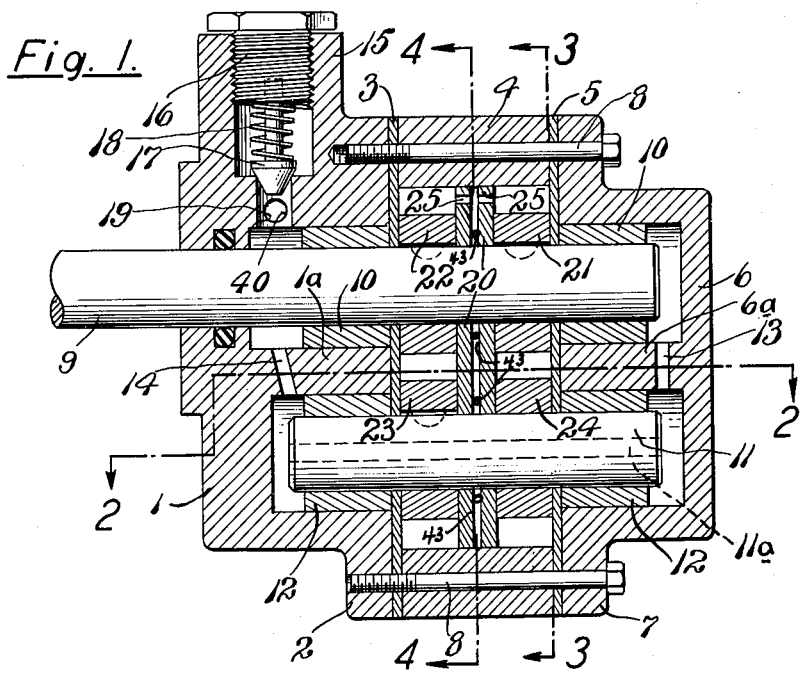
FIG. 1 is a vertical cross-sectional view of a device incorporating the invention taken on the line 1—1 of FIG. 3.
Figure 2:
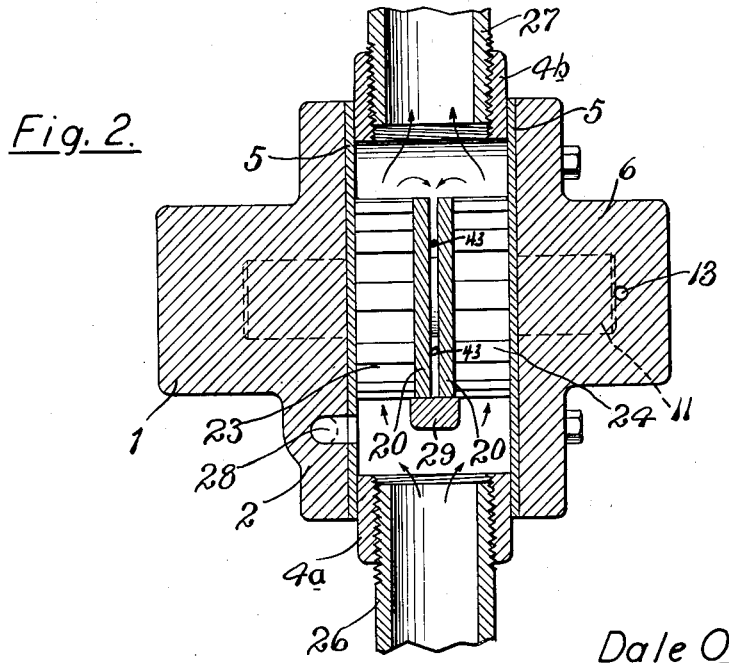
FIG. 2 is a horizontal cross-sectional view of the device of FIG. 1 taken on the line 2—2 thereof.

Referring now to the drawings wherein like numerals refer to like and corresponding parts throughout the several views, the gear pump body disclosed therein to illustrate the invention comprises a first end housing 1 having an attaching flange 2, a second end housing 6 having an attaching flange 7, an intermediate case 4, and wear plates 3 and 5 disposed on either side of the case 4 between the case 4 and the end housings 1 and 6. The bolts 8 lead through the various parts so far described and hold them in assembled relationship. The shafts 9 and 11 are bearinged in the end housings 1 and 6 and extend through the wear plates 3 and 5 and the intermediate case 4; the lateral area between the wear plates 3 and 5 as circumferentially enclosed by the case 4 defines the pump and fluid area of the device in which the pumping gears are disposed and chambered and through which the fluid is passed between the inlet side 4a and the outlet side 4b of the case 4.

More particularly, the gears 21 and 22 are slidably keyed to the drive shaft 9 and mesh with the gears 24 and 23 respectively which are carried on the driven shaft 11; the gears 21 and 22 are axially slidably keyed to the shaft 9 for rotation therewith and axially sliding movement relative thereto and the gear 23 is keyed to the shaft 11 for rotational movement therewith and axial sliding movement relative thereto so that the drive of the shaft 9 is transmitted to the shaft 11 via the gears 22 and 23. Gear 24 is not keyed to the shaft 11 but is axially slidably positioned thereon so that no binding action sets up between the train due to small differences in gear formation in that the gear 24 free wheels rotationally relative to the other gears and shafts. Shaft 9 is supported in the end housings on the bearings 10, and, shaft 11 is supported in the end housing on the bearings 12.

Disposed between the meshed gears are the like, axially movable floating wear plates 20 which are spaced slightly apart such as by a spring or spacer disposed between them as to create an initial fluid receiving chamber defined by the adjacent sides of the plates 20 for receiving fluid under pressure to urge the plates 20 apart as hereinafter more fully described.

The plates 20 are centrally located in the internal area of the case 4 and an arcuate centrally located flange 29 is carried by the case 4 on the intake side, which flange 29 seals against the edges of the wear plates 20 in the area of the intake chamber of the case 4 so that fluid entering the case 4 is sealed off from the space between the plates 20 on the intake side of the device. Thus the space between the plates 20 is charged with fluid under pressure from the outlet side urging the plates 20 sidewise outwardly against the gears 21-24 so as not only to urge themselves against the gears in sealing relationship but also so as to urge the gears into sealing relationship against the fixed wear plates 3 and 5. As the gears are axially slidably positioned and the wear plates 20 are axially slidably located relative to the shafts, and as the intake side of the plates 20 are sealed by the flange 29 and the delivery side of the plates 20 are in communication with the pressure developed by the pump, it is obvious that the plates 20 are urged by the pressure between them in sealing relationship against the gears and in turn, the gears are urged in sealing relationship against the wear plates 3 and 5 as wear progresses so as to insure self-adjusting automatic compensation for wear occurring in the device. The intermediate wear plates 20 may be equipped with apertures 25 for delivering fluid under pressure between the plates 25 to force the plates 20 apart especially at the initiation of operation to assist the springs or spacers 43 in creating the fluid receiving chamber between the plates 20.

The chambers in the end housings 1 and 6 adjacent the ends of the shafts 9 and 11 are interconnected by the channels 13 and 14 in the end housings internal sections 6a and 1a respectively and the channel 11a in the shaft 11 so that potential leakage into these chambers is back pressured by the channel 40 leading from the orifice 41 on the delivery side of the channel 19 and bled off and recirculated past the spring 18 loaded poppet valve 17 on the cap 16 threaded in the boss 15 for a recirculation via the duct 28 to the inlet port chamber of the device where the excess pressure and/or leakage will be reintroduced to the intake side of the pump.

Due to the channel 40 receiving fluid under pressure from the orifice 41 at the output side and delivering fluid under pressure to the channel 19 the chambers at either end of the shafts receive fluid under pressure via the channels 14, 11a, and 13 so that any tendency for fluid to leak past the wear plates 3 and 5 and the bearings 10 and 12 is back pressured and substantially eliminated.

In the event that severe back pressure is encountered by the delivery side, the channel 40 will deliver the excess pressure fluid to the channel 28 to the intake side via the spring 18 loaded poppet valve 17 opening at the predetermined spring loaded setting.

Figure 3:
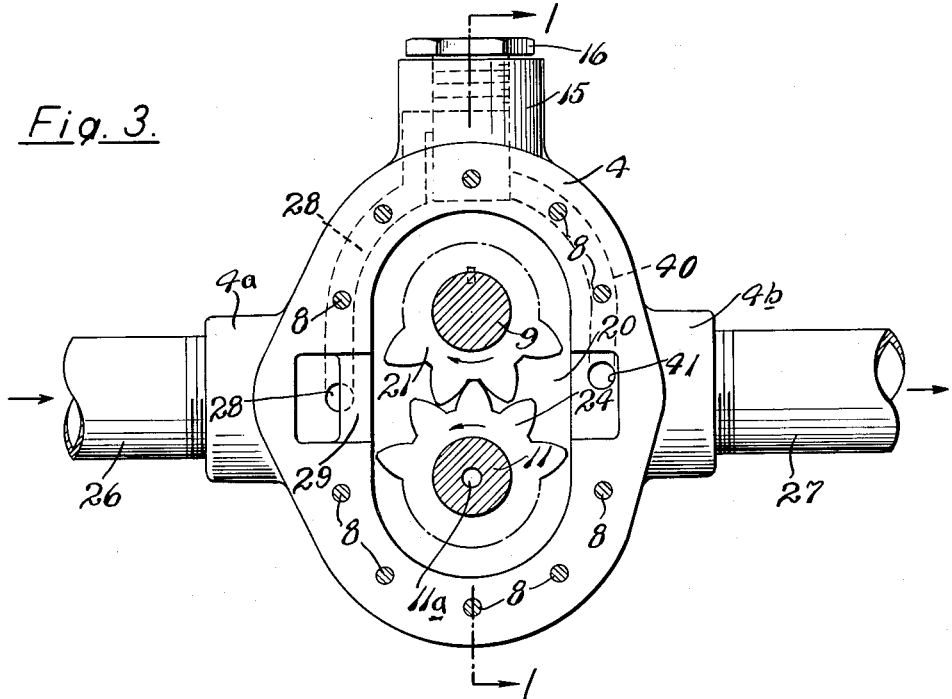
FIG. 3 is a cross-sectional view of the device of FIG. 1 taken on the line 3—3 thereof.
Figure 4:
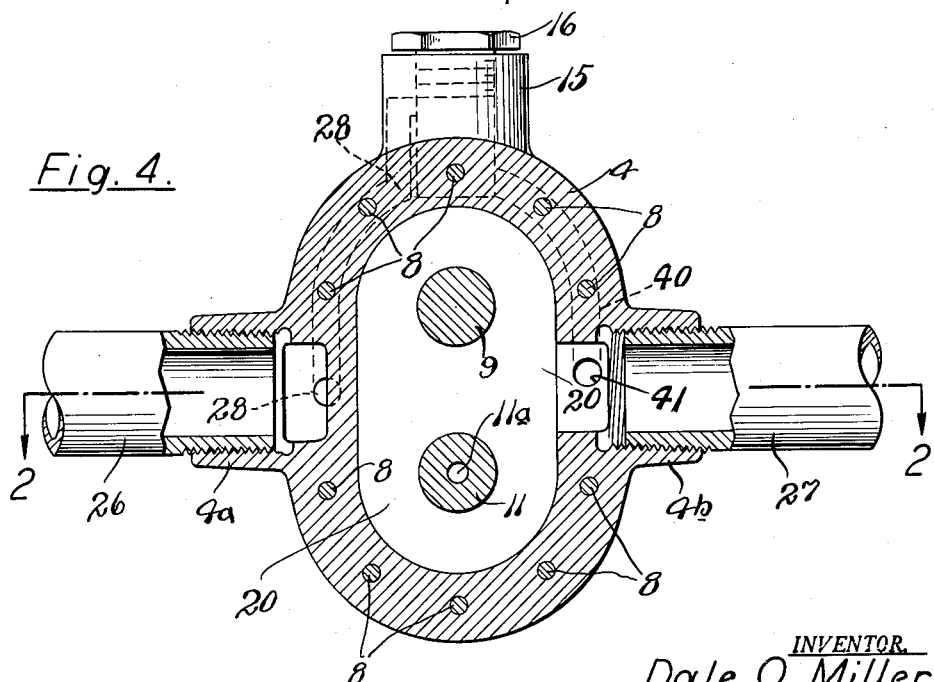
FIG. 4 is a view similar to FIG. 3 taken on the line 4—4 of FIG. 1.

In operation, the device is connected between an intake line 26 and a delivery line 27 and the shaft 9 connected to motor power for rotation whereupon the gears 21 and 22 rotate with the shaft 9 via the key connection therebetween and the gear 22 drives the gear 23 which in turn drives the shaft 11 via the key connection therebetween to eliminate shaft 11 wear relative to the gears 23 and 24. It is to be noted that the gear 24 is in mesh with the gear 21 and is driven thereby but that no key connection is made between the gear 24 and the shaft 11 relative to rotation so that variation in rotation can occur between the gear 24 and the shaft 11 to free wheel out inaccuracies in the various gears. The fluid is supplied to the gears via the intake line 26 and the gears accept the fluid between their teeth and travel the fluid in the direction of the arrows as seen in FIG. 3 in sealed relationship between the wear plates and in sealed relationship to the interior of the case 4 until the teeth again mesh in the area of the delivery side of the pump whereby the fluid is displaced by the meshing of the gears and the fluid is driven out of the delivery side of the pump through the delivery pipe 27. Due to the fact that the fluid is under equal pressure in all portions of the delivery side of the device, the fluid is fed between the plates 20 forcing them apart against the gears on either side thereof so as to urge the plates 20 in sealing relationship against the gears, and in turn, urge the gears in sealing relationship against the plates 3 and 5. The flat spring or spacer 43 disposed between the plates 20 keeps the plates apart during periods of pump inactivity so that a chamber exists for receiving the fluid under pressure upon activation of the device. It can be seen that almost any amount of wear can be compensated by the fluid pressure between the plates 20 due to the fact that an unlimited amount of fluid under pressure is available for urging the plates 20 apart.

While the embodiment of the device as illustrated and described has been shown with pairs of gears and paired axially movable wear plates under fluid pressure, it is obvious to those skilled in the art that a single pair of gears could be utilized and the single movable wear plates used and a fluid pressure chamber developed between the single movable wear plate and a side wall or end wall of the device thereby obviating the necessity of paired gear trains and paired wear plates. It is also obvious that several or multiple paired sets of gears can be used with paired pressure plates therebetween if so desired.

It is to be particularly noted that the bearings as illustrated are multiples of a single bearing unit, that the pressure plates 3 and 5 are identical, that the gears are duplicates, and that the paired pressure plates 20 are duplicates facilitating manufacture by part duplication thereby simplifying the part manufacture and service part availability. The inventive gear pump with these features constitutes a compact, durable, neat appearing and easily manufactured and maintained mechanism. It is also obvious that the parts of the device are also easily manufactured due to the fact that they are flat surfaces and lack detail and intricate conformation.

Although but a single embodiment of the invention has been shown and described in detail, it is obvious that many changes may be made in the size, shape, detail, and arrangements of the elements of the invention within the scope of the appended claims.

I claim:
1. A gear pump comprising a first end housing, first shaft bearings disposed in said first end housing, a second end housing spaced from and aligned with said first end housing, second shaft bearings disposed in said second end housing, side wear plates disposed over said end housings having shaft receiving apertures aligned with said bearings, an intermediate case disposed between said side wear plates, bolts securing said end housings, side wear plates, and case together; said case and said side wear plates defining a gear pump chamber; a drive shaft journaled in one of said first and second bearings, a driven shaft journaled in one of said first and second bearings; said shafts extending through said side wear plates and lying in said chamber; at least two pair of gears disposed on said shafts in meshing relationship on both sides of said chamber bearing against said side wear plates with said gear pairs being spaced from each other in the area of the center of said chamber, paired intermediate wear plates having apertures for receiving said shafts disposed in said chamber between said gear pairs in spaced relationship to each other; said case having inlet and outlet apertures communicating with each other past said gears via said chamber; a flange in said case at the inlet side thereof contacting said intermediate wear plates so as to seal off the space between said wear plates from inlet communication at the inlet side; said flange being supported on said housing; the space between said intermediate wear plates on the outlet side being open in direct communication with said outlet pressure so that fluid pressure developed by said pump enters between said intermediate plates and is blocked by said flange from inlet communication and forces said intermediate plates against said gears in sealing relationship and said gears against said side wear plates in sealing relationship; said intermediate wear plates and said gears being adapted to move axially of said shafts under fluid pressure to automatically compensate wear plates and gear erosion.

2. In a device as set forth in claim 1, chambers in said housings at both ends of said shafts; channels in said housings interconnecting said chambers, and a channel in said driven shaft cross connecting said interconnected chambers, and a channel from the outlet side leading to said connected chambers for supplying fluid under pressure thereto for back pressuring said shaft end areas against leakage.

3. In a device as set forth in claim 2, a channel leading to the inlet side of said device communicating with said outlet side channel, and a poppet valve disposed between said inlet and outlet; said channels adapted to open to relieve excess pressure at the outlet side and to recirculate the fluid to the inlet side and to maintain fluid back pressure at said shaft chambers; said poppet valve being located in said channel leading to said inlet side so as to normally prevent recirculation between said inlet and outlet sides below a predetermined normal pumping pressure and to relieve excess pressure when the normal pressure is exceeded.

References Cited in the file of this patent
UNITED STATES PATENTS

| 1,103,053 | Kiefer | July 14, 1914 |
| 2,009,137 | Kleckner | July 23, 1935 |

(References on following page)

UNITED STATES PATENTS

| | | |
|---|---|---|
| 2,103,524 | Ernst | Dec. 28, 1937 |
| 2,382,042 | Etnyre | Aug. 14, 1945 |
| 2,412,588 | Lauck | Dec. 17, 1946 |
| 2,444,165 | Lauck | June 29, 1948 |
| 2,487,732 | Schanzlin | Nov. 8, 1949 |
| 2,540,235 | Berkley | Feb. 6, 1951 |
| 2,584,865 | Gordinier | Feb. 5, 1952 |
| 2,622,534 | Johnson | Dec. 23, 1952 |
| 2,649,740 | Murray et al. | Aug. 25, 1953 |
| 2,665,641 | Lauck | Jan. 12, 1954 |
| 2,676,548 | Lauck | Apr. 27, 1954 |
| 2,699,724 | Murray et al. | Jan. 18, 1955 |
| 2,702,509 | Garnier | Feb. 22, 1955 |
| 2,714,857 | Albright et al. | Aug. 9, 1955 |
| 2,726,604 | Aspelin et al. | Dec. 13, 1955 |
| 2,728,301 | Lindberg | Dec. 27, 1955 |
| 2,746,394 | Dolza et al. | May 22, 1956 |

FOREIGN PATENTS

| | | |
|---|---|---|
| 716,036 | Germany | Jan. 12, 1942 |
| 900,188 | France | Sept. 18, 1944 |